June 9, 1970 O. E. ALBERTSON ET AL Re. 26,908

DISPOSAL OF WASTE MATERIAL BY COMBUSTION IN AN INERT FLUIDIZED BED

Original Filed March 31, 1964 5 Sheets-Sheet 1

INVENTORS,
ORRIS E. ALBERTSON
WILLIAM M. H. KILMER
BY Theodore M. Jablon
ATTORNEY.

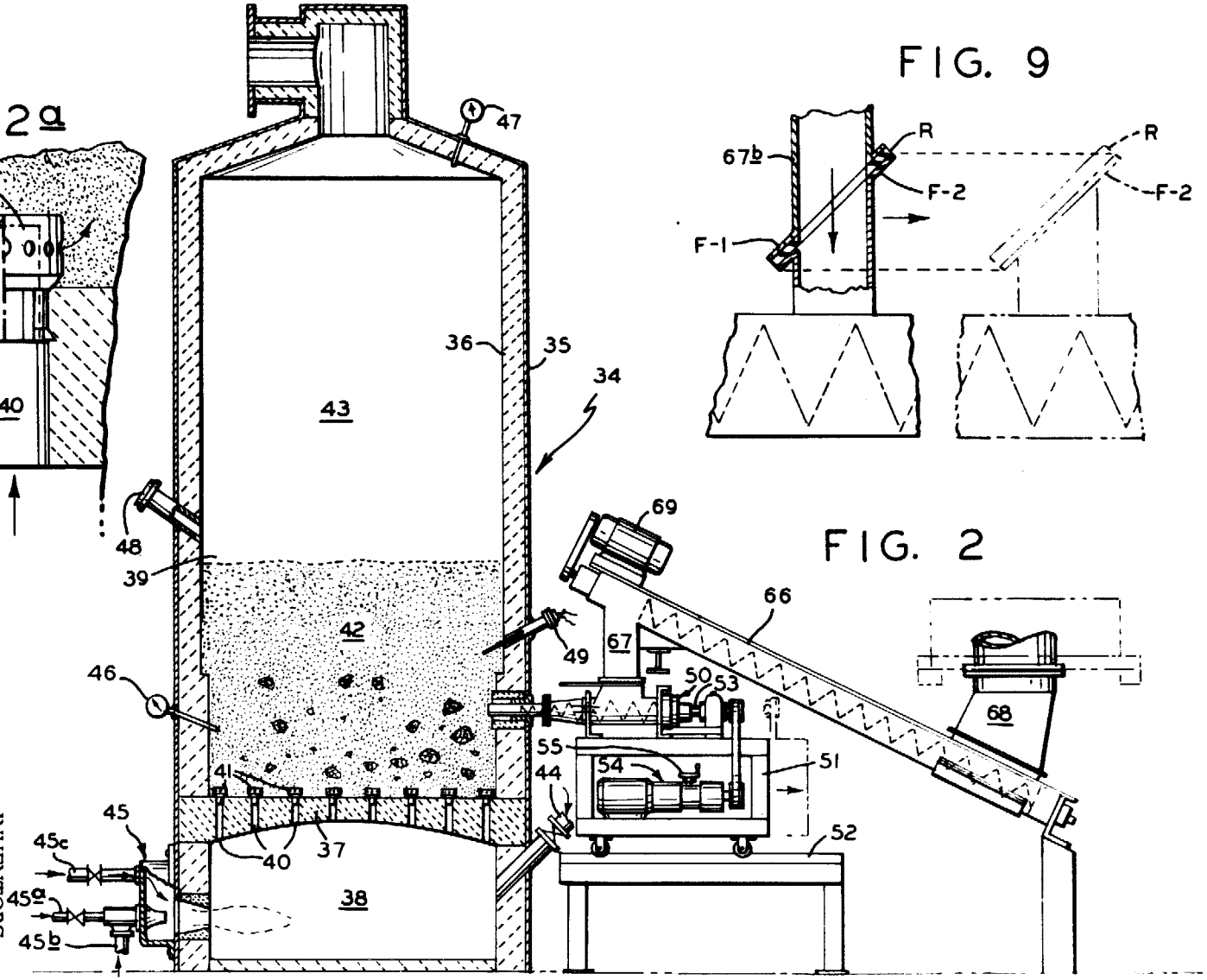
INVENTORS.
ORRIS E. ALBERTSON
WILLIAM M. H. KILMER
BY Theodore M. Jablon
ATTORNEY.

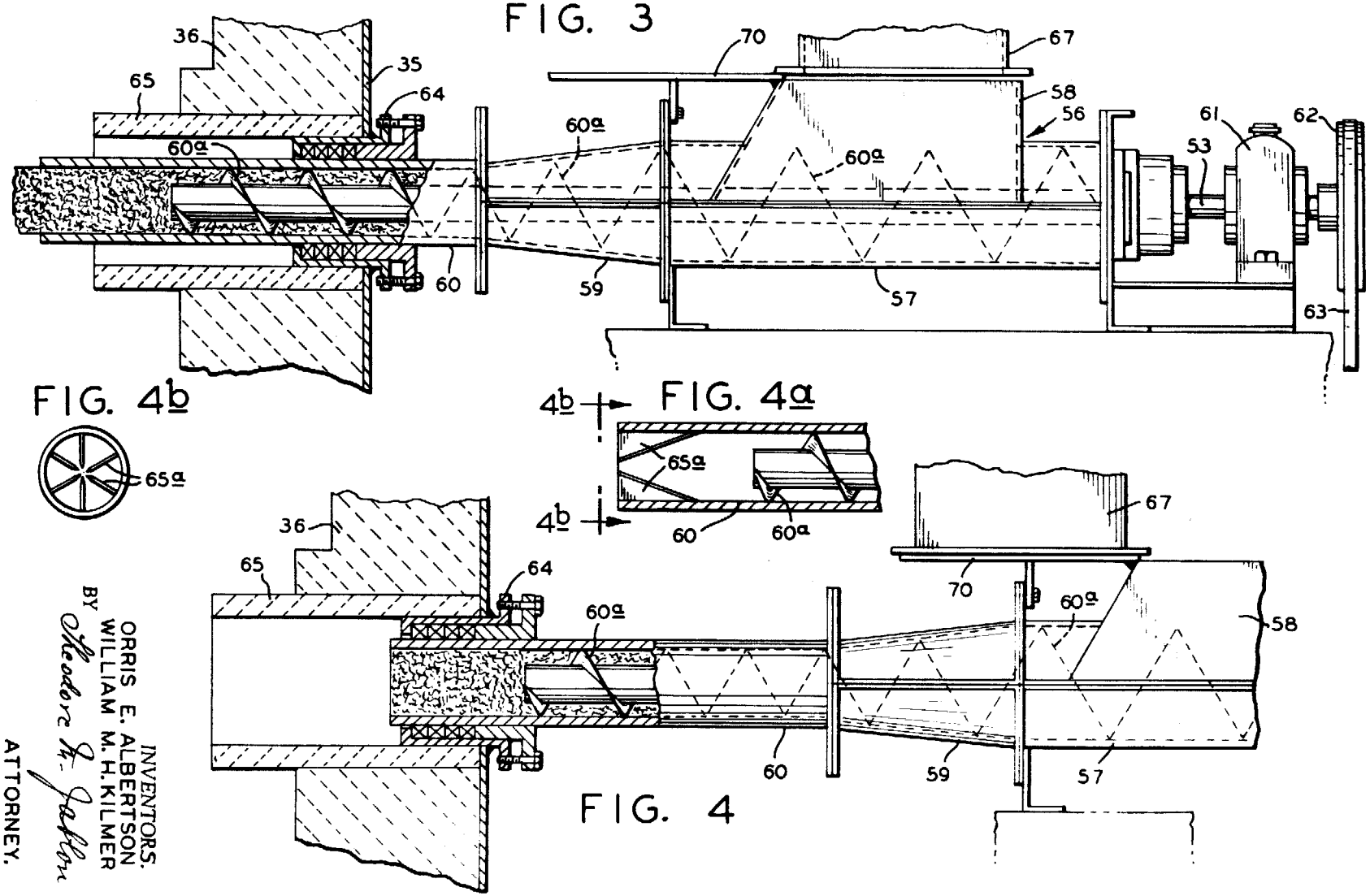
INVENTORS.
ORRIS E. ALBERTSON
WILLIAM M. H. KILMER
BY Theodore H. Jablon
ATTORNEY.

INVENTORS.
ORRIS E. ALBERTSON
WILLIAM M. H. KILMER
BY Theodore M. Jablon
ATTORNEY.

INVENTORS.
ORRIS E. ALBERTSON
WILLIAM M. H. KILMER
BY Theodore M. Jablon
ATTORNEY.

United States Patent Office

Re. 26,908
Reissued June 9, 1970

26,908

DISPOSAL OF WASTE MATERIAL BY COMBUSTION IN AN INERT FLUIDIZED BED

Orris E. Albertson, Norwalk, Conn., and William M. H. Kilmer, Gloucester, Mass., assignors to Dorr-Oliver Incorporated, Stamford, Conn., a corporation of Delaware Original No. 3,319,587, dated May 16, 1967, Ser. No. 356,211, Mar. 31, 1964. Application for reissue Nov. 1, 1968, Ser. No. 785,819
Int. Cl. F23g *5/00*
U.S. Cl. 110—8 12 Claims

Matter enclosed in heavy brackets [ ] appears in the original patent but forms no part of this reissue specification; matter printed in italics indicates the additions made by reissue.

*ABSTRACT OF THE DISCLOSURE*

*Organic waste having a high moisture content is burned in a fluidized bed of inert granular material. The granular bed is contained within chamber walls upwardly flared to compensate for gas expansion.*

This invention relates to the disposal of wet waste material by combustion, wherein the waste matter largely comprises organic or volatile constituents, part of which may be putrescible. In some respects this invention is an improvement on that disclosed in an application to Albertson et al., Ser. No. 131,455 filed July 10, 1961, for treatment and disposal of Waste Sludges.

For example, such high moisture waste may be of the kind that is derived from sewage sludge by filtration or other dewatering operations, thus having a moisture content from about 80% to about 65%, or it may be waste in the nature of wet garbage or the like of comparable moisture content.

This invention is concerned with direct combustion of organic waste material having a high moisture content, under specially controlled conditions.

To the above and the waste matter is fed continuously into a body of hot inert fluidized granular material having heat-storing and heat-radiating capability, for example, sand. The fluidized or teeter state of this granular material is maintained in the combustion chamber by the combustion air being forced upwardly therethrough.

Thus, the air pressure should be sufficient to keep the sand particles in teeter which in turn depends upon the inventory of inert particles to be thus maintained in depth. The devices for introducing the wet waste material into the combustion chamber should provide an adequate seal against that pressure.

Under the foregoing conditions, and with certain controls of the combustion process itself, direct and complete combustion of the wet waste is attainable with the result that the stack gases discharging from the combustion chamber comprise only inert and inocuous combustion gases along with water vapor, carrying with them the residual ash and inert fines. To this end, the controls of this combustion process should maintain a high enough combustion temperature in the body of fluidized material, while maintaining a low excess of combustion air.

However, optimum efficiency of such a combustion operation further depends upon achieving the combustion of the organic waste within the confines of said body of hot inert fluidized material, which presents the problem of minimizing or eliminating the afterburning of waste material and/or of its distillation gases that might occur in the freeboard space above the body of the fluidized granular material.

According to the invention, under the above conditions afterburning is minimized by extruding the high moisture waste material tightly compacted into the lower zone of the body of hot inert fluidized material maintained in the combustion chamber. Thus, the waste material is delivered from an extrusion device in the form of plugs or chunks compacted to a density approximately equal to the density of or greater than the surrounding body of fluidized material. Gradually these chunks become more and more fragmented, finally disintegrated, and destroyed by combustion, with evaporation of the water taking place concurrently within the confines of the body of inert fluidized material.

Furthermore, while the extrusion feeding operation of this invention serves the purpose of sealing-in the aforementioned required operating pressure in the combustion chamber, yet another problem arises.

During shutdown periods, intense radiation heat from the sand bed would adversely affect the terminal portion of wet waste material remaining in the discharge end of the extrusion feeder, rendering that portion into a coked and hardened mass blocking the resumption of extrusion feeding.

Therefore, the invention provides a wet waste combustion unit equipped with an extrusion feeding device operable in such a manner that residual compacted wet waste material in the feeder will not be adversely affected by the heat, and will provide an effective gas pressure seal.

Therefore, according to one embodiment, following shutdown of the unit, the feed device may be retracted so that the extrusion mouthpiece and residual material therein is withdrawn sufficiently from the heat effects even though maintaining sealing relationship with the wall of the combustion chamber.

According to another embodiment, with the extrusion feeding device remaining stationary following shutdown, the residual terminal portion of the compacted material is ejected by an air pressure device or the like, leaving a compacted portion of the material in the feeder intact as a gas pressure seal.

Furthermore, the invention provides means to compensate for an increase in the volume of the fluidizing gas during its upward movement from a constriction plate through the body of hot fluidized material. To compensate, the lower end portion of the combustion chamber is formed with a downwardly narrowing constriction preferably of inverted trunco-conical configuration. The chunks or plugs of compacted wet waste material, momentarily suspended by the thus relatively increased space rate in the bottom zone, are thus reduced or fragmented more rapidly, and then are more rapidly destroyed by complete combustion before reaching the top level of the body of hot fluidized material.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIG. 2 is an enlarged vertical sectional view of the combustion unit, featuring a retractable extrusion feeder complete with power drive therefor;

FIG. 2a shows a constructional detail of the construction plate in the combustion unit;

FIG. 3 is a greatly enlarged detail view of the extrusion feeding device of FIG. 2 in advanced position for delivering compressed waste material into the combustion chamber in the form of extruded plugs;

FIG. 4 is a view similar to FIG. 3 with the extrusion device in retracted position during shutdown of the unit, protected against heat;

FIG. 4a is a detail longitudinal sectional view of the delivery end of the extrusion feeder, provided with means for subdividing the extrusion plugs;

FIG. 4b is an end view of FIG. 4a;

FIG. 9 illustrates another form of the waste feeding arrangement illustrated in FIGS. 5 to 8;

Figure 1:
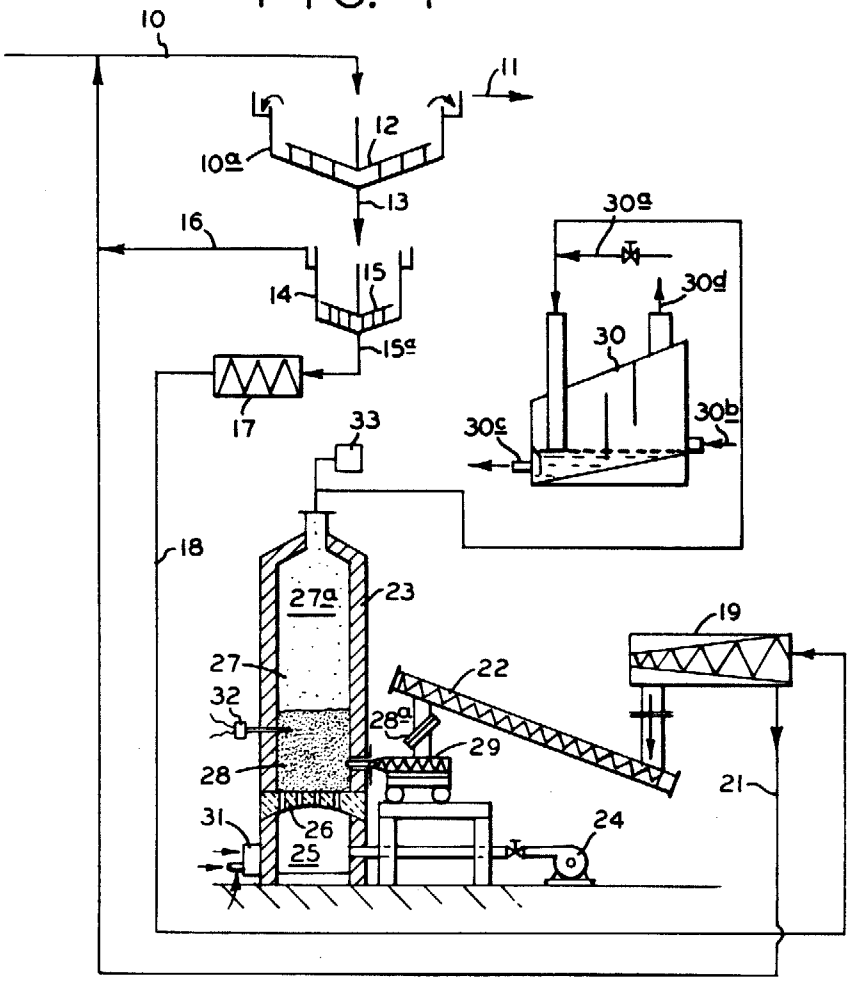
FIG. 1 is a flowsheet showing the invention embodied in a sewage treatment system wherein the combustion unit is supplied with dewatered sewage sludge with a screw feeder device compressing the wet waste material into plugs.
Figure 5:
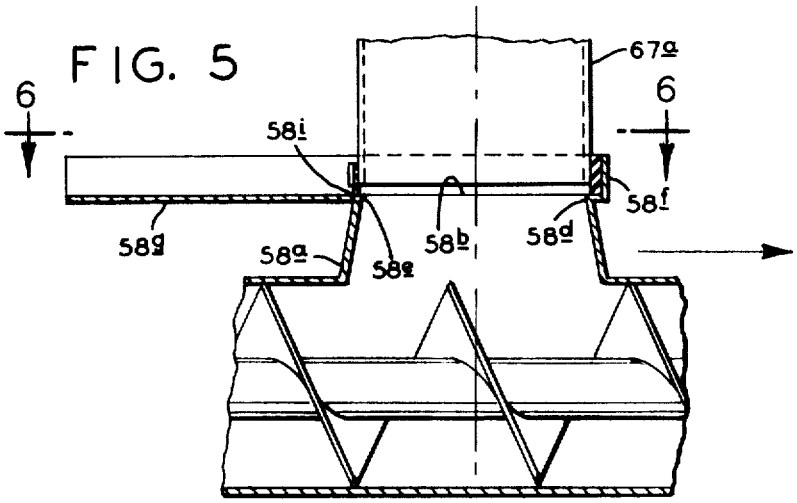
FIGS. 5 to 8 illustrate the cooperative relationship between the retractable feeder device and stationary supply means therefor.
Figure 6:
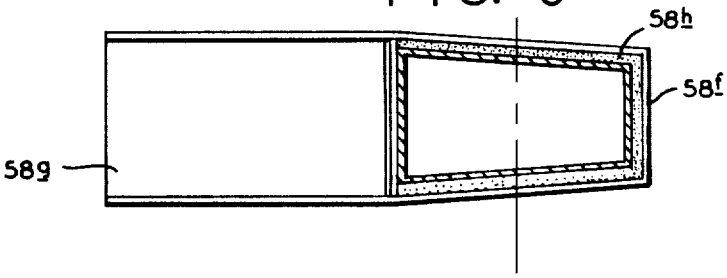

According to the flowsheet shown in FIG. 1 the invention is exemplified in connection with the treatment of sewage wherein the final disposal of the organic sewage solids is effected by combustion. In that flowsheet raw sewage indicated at 10 enters a continuously operating conventional clarifier settling tank 10a from which raw sewage liquor overflows at 11 further to be disposed of in any well known suitable manner, while raw sewage solids settling to the bottom of the tank are engaged by the rotary rake structure 12 and thereby continuously conveyed to a central point of discharge. The resulting dilute sludge 13 from this clarifier is then subjected to further concentration in a continuous thickening tank 14 wherein the thickened sludge is subjected to the action of a rotary rake structure 15, to be delivered centrally at 15a, while supernatant liquor 16 overflows.

The thus thickened slude is then pumped substantially continuously, for instance by a Moyno type of pump 17 along the line 18 to a continuously operating dewatering apparatus, for example a solid bowl type centrifuge 19 of itself well known and effective to dewater the sludge to a solids concentration which may lie in a range from about 25% to about 35% total solids concentration. Alternative dewatering apparatus may be in the form of a continuously operating drum filter also well known of itself.

The cake material discharging from the narrow end of the solid bowl of centrifuge 19 provides the high moisture waste to be subjected to direct combustion in accordance with the teachings of this invention, while the centrifugally separated liquor overflowing at the wide end of the bowl is passed along the line 21 to the raw sewage feed, being joined on the way be supernatant liquor from the thickener 14.

The wet waste material delivered by the centrifuge may gravitate to the lower end of an inclined screw conveyor 22 which from its upper end delivers the material to the combustion unit 23 for direct combustion.

A blower 24 supplies combustion air to the windbox 25 of the combustion unit, forcing the air upwardly through orifice plate 26 called a constriction plate into the combustion chamber 27. For the purpose of this invention there is maintained upon this constriction plate an inventory of inert granular material 28 having heat-storing and heat-radiating capability. This granular material suitably sized, for example, sand is maintained in a state of teeder or fluidization by the combustion air being forced upwardly through the constriction plate. A freeboard space 27a is provided above the body of fluidized sand.

The high moisture waste material from the inclined conveyor screw passing through a vertical connection 28a is received by an extrusion device embodying a screw feeder 29 for continuously supplying a plug of this waste material into the body of inert fluidized material which is kept hot at suitable combustion temperature substantially by the combustion of the organic matter in the waste. With suitable controls the combustion of this wet material may thus be self-sustained and complete with only inert combustion gases carrying ash material and inert fines escaping from the combustion unit through the stack.

Sufficient gas pressure is maintained in the combustion chamber from the air blower to maintain the sand in the aforementioned state of fluidization, and further to allow for the stack gases to be sent through a scrubber 30, for example of the type known as the Doyle scrubber, or other dust separating apparatus.

The windbox chamber of the combustion unit is provided with a fuel burner 31 mainly for preheating and initiating the fluidization of the inventory of inert granular material preparatory to starting the supply of the high moisture waste into the combustion chamber and thus starting the waste combustion operation proper.

Also provided are a temperature indicating device 32 measuring the combustion temperature in the body of hot inert fluidized material, and a stack gas analyzer 33 measuring and indicating the oxygen excess in the combustion gases.

The manner of operation of the Doyle gas scrubber 30 is well known, with quench water supplied at 30a, scrubber water supplied at 30b, spent scrubber water and intercepted dust solids or sludge discharging at 30c, and the scrubbed gases discharging at 30d into the atmosphere.

The greatly enlarged showing of the combustion system in FIG. 2 represents one of the embodiments of this invention wherein the combustion unit itself is combined with a retractable screw feeder or feed gun for introducing the high moisture waste into the combustion chamber. That is to say, during normal operation the screw feeder is in the advanced position continuously delivering compacted wet waste material into the combustion chamber in the form of plugs or chunks. But, following shutdown of the operation, the screw feeder is retracted sufficiently to remove the delivery end portion of the feeder with the compacted material therein away from the direct adverse effect of the heat which persists in the combustion chamber and is largely stored in the mass of hot inert granular material maintained therein, all the while maintaining sealing relationship between the feeder device and the wall of the combustion chamber.

According to the embodiment in FIG. 2, the combustion unit 34 resembling a vertical tower comprises an external cylindrical steel shell 35 having a lining 36 of refractory material or the like of substantial thickness, suitable to withstand the combustion temperatures, also providing adequate heat insulation relative to the shell. The top end of the combustion unit is connected to a stack.

A constriction plate 37 mounted as shown and shown to consist of suitable refractory material divides the tower or shell into a windbox chamber 38 and a much higher combustion chamber 39. The constriction plate has evenly distributed gas passages 40 each of which has a gas diffusion cap 41 or the like (see also detail FIG. 2a) designed to allow for the upward passage of a fluidizing gas or air, while preventing the downward passage of particals from the combustion chamber through the constriction plate when the supply of fluidizing air is stopped.

The inventory of inert granular material or sand 42 maintained in the combustion chamber is indicated as being in the fluidized or expanded state with a freeboard space 43 available above. But upon stoppage of the supply of fluidizing air, this expanded bed would subside to about two thirds of its expanded depth as the particles settle down upon the constriction plate.

A controllable supply of fluidizing air is indicated at 44, and an auxiliary or starting fuel burner at 45 having a fuel connection at 45a, a connection for primary combustion air at 45b, and a connection for secondary combustion air at 45c. The gas pressure in various zones or sections of the combustion unit may be determined by the provision at suitable points of gas pressure gauges, for example a gauge 46 in the combustion zone of inert fluidized material, and a gauge 47 in the freeboard zone. A connection 48 may be opened for replenshing the sand inventory. A thermo-couple 49 is provided for indicating the combustion temperature in the bed of fluidized material.

Within the bed of fluidized material there are indicated some chunks of compacted wet waste material in various stages of fragmentation, disintegration and combustion. In one embodiment the compacted material is delivered into the bed by way of extrusion from a retractable screw feeder device and its accessories, and this embodiment will now be described in more detail by reference to FIG. 2 as well as to the detail FIGURES 3, 4, 4a, and 4b.

Accordingly, an extrusion screw feeding device 50 is mounted upon a wheeled support structure 51 movable upon tracks 52 towards and away from the combustion unit. The shaft of the extrusion screw 53 is driven by a reduction gear motor unit 54 also mounted upon the wheeled structure, with variable speed reducing means indicated by the hand wheel 55.

Referring more particularly to the details of FIGS. 3, 4, 4a, and 4b, the extrusion screw is mounted for rotation in a housing structure 56 comprising first a body portion or straight section 57 formed upwardly with a neck 58 for receiving the wet feed material, a tapered or trunco-conical or intermediate section 59 flange-connected to the straight section, and a straight tubular delivery end section 60 flange-connected to the narrow end of the intermediate section. The extrusion screw member has a spiral conveying blade 60a of various diameters dimensioned to fit the various sections of the housing. The outer end portion of the shaft of the extrusion screw is supported in a bearing 61, while the opposite end of the shaft supports itself through the conveyor blade within the tubular delivery section 60. A pulley 62 is mounted upon the extreme outer end of the shaft driven as by a V-belt 63 or the like from the aforementioned gear motor reduction drive.

The tubular delivery end section 60 of the extrusion feeder is slidable in a gland device 64 mounted in the steel shell of the combustion unit. Surrounding this gland device is a tubular member 65 of refractory material cemented into the refractory lining 36 and providing a shield for the delivery section against the heat from the combustion chamber especially when the feeder device is in the retracted position shown in FIG. 4.

The tubular delivery end portion of the extrusion feeder may be provided with means for effecting the subdivision of the material. In one embodiment, the tubular delivery end portion has internally provided therein a plurality of radially directed cutting blades 65a, the arrangement of which is clearly shown in FIG. 4a and FIG. 4b. These cutting blades have the effect of subdividing the compacted material in the process of extrusion thereof from the feeder device.

Subdivision of the plug in this way is particularly beneficial where the rated capacity requires a large plug diameter. Subdividing this large size plug will effect better distribution of the material throughout the lower zone of the fluidized mass and will compensatingly control the rate of disintegration. The triangular shape of the cutting blades will cause rags or the like to be extruded along with the subdivided plug without causing an obstruction.

Inasmuch as the feeder device is movable to and fro, provision is made for the neck 58 of that device to connect and to disconnect with respect to the inclined stationary screw conveyor 66. This screw conveyor has at its upper end a downwardly directed discharge neck 67 cooperating with the extrusion feeder, while the lower end has an upwardly directed inlet neck 68 receiving the concentrate or moist cake of dewatered sludge from the solid bowl type centrifuge 19 (see FIG. 1). A drive motor 69 for the screw conveyor is mounted upon the top end portion thereof.

In FIG. 3 with the extrusion feeder in the advanced position, the neck 58 thereof registers with the neck 67 of the conveyor. In FIG. 4, however, with the extrusion feeder retracted, the neck 67 is closed by a closure plate or tray 70 rigidly connected to neck 58 of the extrusion feeder.

In another embodiment, according to FIGS. 5 to 8, the extrusion feeder housing has an inlet neck 58a formed with two converging sides 58b and 58c, a shorter transverse side 58d and a longer transverse 58e. An upright ledge or edge portion 58f extends along the short transverse side 58d and from there along the diverging sides 58b and 58c to the wide transverse side 58e and from there they continue parallel to each other along the sides of horizontal plate or tray 58g fixed to the neck 58a. In the advanced position of the extrusion feeder the neck 67a of the conveyor being correspondingly shaped with converging sides and transverse sides, sealingly engages liner 58h made of sponge rubber or the like and fastened to the ledges 58f, while a flexible lip 58i on neck 67a seals the respective longer transverse sides against each other.

Figure 7:
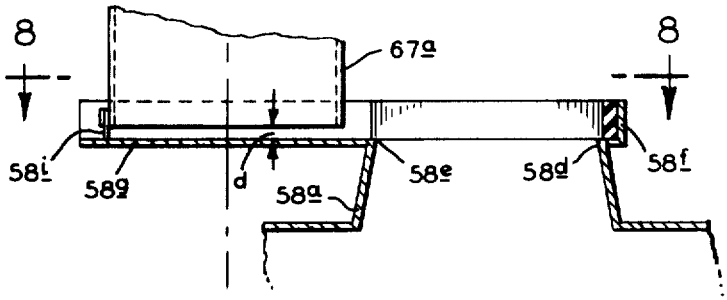
Figure 8:
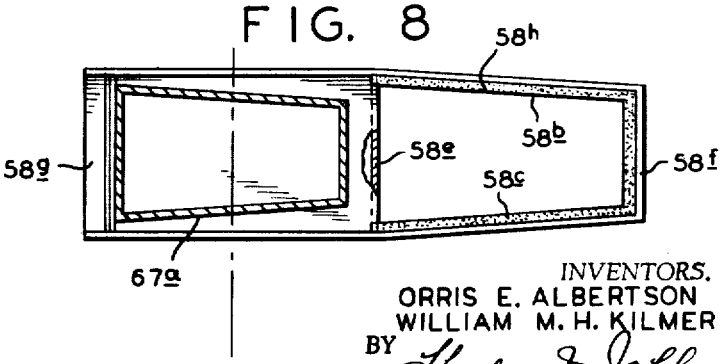

When the extrusion feeder is retracted as in FIGS. 7 and 8, the neck 67a is opposite plate 58g although spaced a slight distance d therefrom, but effective to retain any residual matter in the downwardly directed neck 67a. Again, upon advancing of the extrusion feeder, the lip 58i will wipe the plate 58g clean of any residue.

In still another embodiment (see FIG. 9) the downwardly directed neck 67b is allowed to run empty of the waste material before the extrusion feeder is retracted, at which time the angularly directed flanges F–1 and F–2 of the cooperating necks will separate as indicated in dot and dash. When the extrusion feeder is again advanced, these inclined flanges again will close upon each other, preferably with a sealing ring member R interposed.

Figures 10, 11, 12:
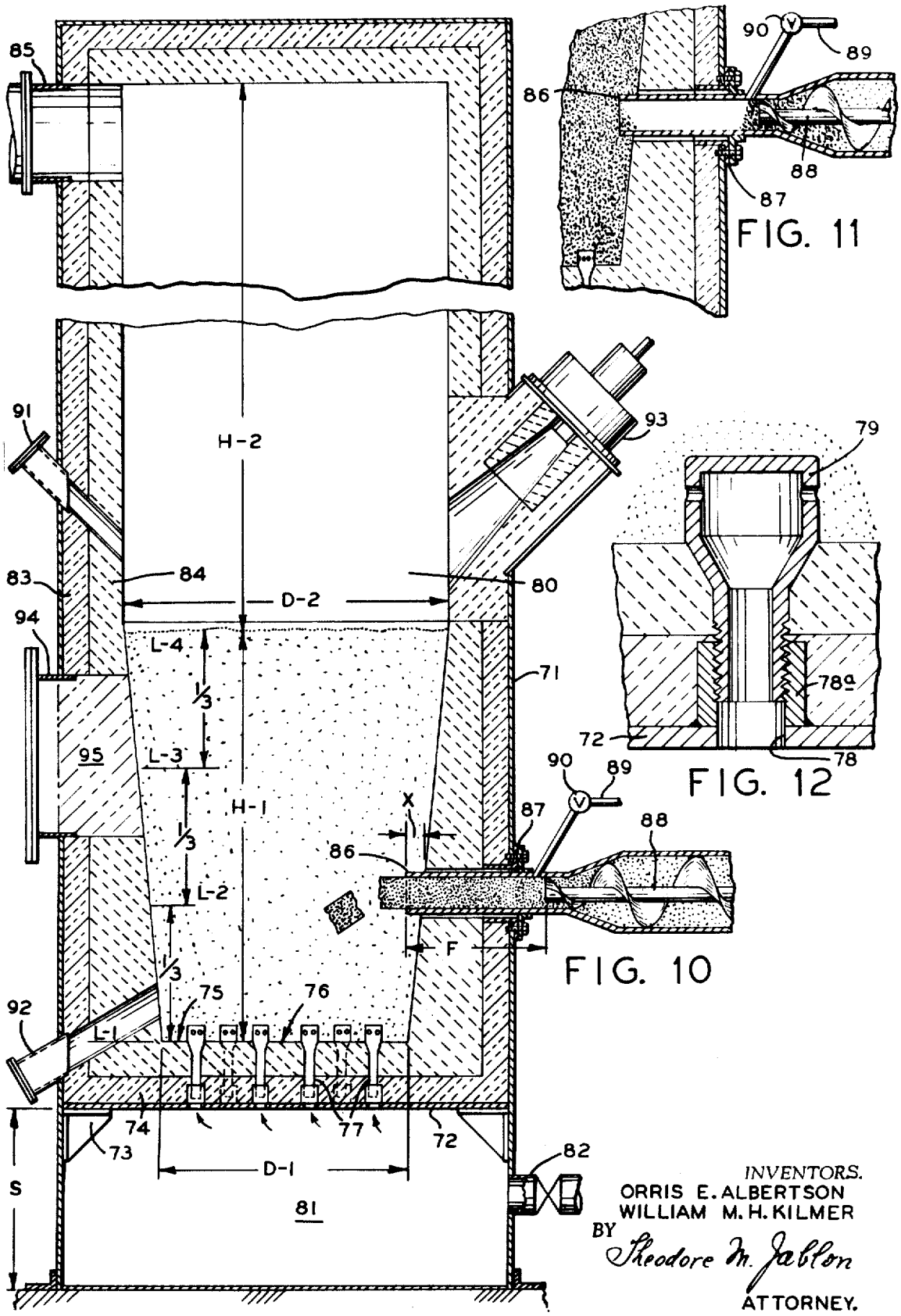
FIG. 10 shows another embodiment of the invention featuring a stationary extrusion feeder provided with pneumatic plug ejecting means.
FIG. 11 is a detail view showing the extrusion feeder of FIG. 10, with the plug ejected.
FIG. 12 is an enlarged detail view of part of the constriction plate.

In the embodiment of FIG. 10 the combustion unit comprises a vertical shell 71 wherein a transverse steel plate 72 is supported upon brackets 73 fixed to the inside of the shell. This steel plate in turn supports a layer 74 of suitable insulating material which in turn is overlain by a layer 75 of refractory material. This combination constitutes the constriction plate 76 which has suitably arranged air passages 77 for the fluidizing air. In detail (see FIG. 12) these air passages comprise holes 78 in the steel plate 72 each hole having fixed thereto an upward neck 78a into which is threaded the neck of a cap member 79 designed to admit the fluidizing air into the combustion chamber while preventing downward escape therethrough of solids from the chamber. The combustion chamber is designated by numeral 80.

The constriction plate is spaced a distance S from the bottom end of the shell sufficient to provide a windbox 81, and to provide for access thereto if so desired. This windbox has a combustion pressure air connection 82.

The combustion chamber 80 is lined similarly with a layer of insulation 83 and with a layer of refractory material 84 adapted to withstand the combustion temperatures. An exit 85 at the top end of the combustion chamber leads to a stack.

More particularly, in this embodiment, the lower end portion of the combustion chamber, that is about one third of the total height thereof is shaped to have downwardly gradually narrowing cross section. In other words, this lower end portion of the combustion chamber is of inverted trunco-conical shape, with the smallest diameter D–1 at the bottom and the largest diameter D–2 at the top. This lower end portion of the combustion chamber contains the inventory of granular material having heat-storing and heat-radiating capability, which inventory is here shown in the expanded or fluidized state being of the height H-1. The freeboard space above is designated by the height H-2.

An extrusion feeder device for this combustion unit differs from the one in FIGS. 1 to 9 in that it is nonmovably connected to the shell, featuring pneumatic pressure means or the like for ejecting a plug of the compacted material from the delivery end portion of the feeder device, while the remaining compacted material therein acts as a pressure seal sufficiently remote from the effects of the reservoir of heat contained in the inventory of the inert granular material.

Accordingly, the extrusion feeder here only fragmentarily shown, has a tubular delivery end portion 86 flange-connected to the shell at 87. This tubular delivery portion extends through the wall of the combustion chamber, terminating a short distance X inwardly therefrom. The feeder screw 88 of this device terminates a distance F from the free end of the tubular delivery portion, and to that extent it is filled with a plug of the compacted material in the process of extrusion.

When the operation of the combustion unit is interrupted, that is the supply of combustion air under pressure into the windbox ceases and the rotation of the feeder screw 87 stops, while the sand subsides from its fluidized state, then according to this embodiment, a compressed air—or steam supply connection 89 is opened sufficiently by operating valve 90 to eject the plug of material from the tubular delivery portion into the bed of hot sand. This ejection may be effected just before the shutdown of the combustion unit. The remaining portion of compacted material held by the feeder screw in this device is then safely remote the distance F from the effects of the heat reservoir in the sand.

The combustion chamber is here shown provided with a supply connection 91 for adding sand, a discharge connection 92 to be used in case the sand bed is to be removed. An auxiliary fuel burner 93 is mounted in the wall of the combustion chamber, to be used mainly for starting up the combustion unit while bringing the bed of fluidized sand up to combustion temperatures. A manhole 94 allows for access into the combustion chamber after the filler 95 of refractory material therein is removed.

Taking, for example the disposal of sewage sludge according to the flowsheet of FIG. 1, the invention may be carried out efficiently and economically with certain controls of the wet waste combustion operation, as set forth in the copending patent application by Albertson et al., Ser. No. 131,455, filed July 10, 1961. That application teaches that the direct combustion of dewatered sewage sludge or the like can be carried out directly at a total solids concentration of less than 50% and usually in a range from about 20% to about 35%, and with less than 50% excess air maintained in the combustion gases but preferably in a range from about 10% to about 30%, and with the temperature in the body of hot fluidized inert granular material maintained in a range from about 1200° F. to about 1600° F.

More particularly, according to the present invention, the combustion of the wet waste material in the body of hot inert granular material should be so controlled that the distillation gases from the organic substances as well as the fixed carbon contained in the waste material should be consumed by combustion within the body of the fluidized material in order that the desired high combustion temperature may be developed and maintained. Afterburning in the freeboard space above the body of fluidized material should be discouraged or prevented inasmuch as this would cause the lowering of the temperature in the fluidized material.

In order to avoid or minimize afterburning, the ideal condition from the point of view of efficiency of the operation to be sought would be to have the high moisture waste material instantaneously dispersed and distributed across the lower zone of the body of fluidized material. Then, the material must have its moisture content reduced to about 10% before combustion will be initiated. The combustion itself then proceeds in two phases, namely in that first volatile matter is distilled off and must be burned, while the fixed carbon must be burned subsequently at a higher temperature. However, such ideal conditions are not directly or practically feasible.

Nevertheless, the invention approximates that condition by employing the above described extrusion device in such a manner that the wet waste material is continuously compacted and extruded into the mass of hot fluidized sand, in the form of chunks or plugs having a density substantially equal to, or greater than that of the mass of fluidized sand the weight of which is about 65 lbs. per cu. ft.

Furthermore, by causing the plugs of waste material to become subdivided in the process of extrusion, as by means of the above described cutting blades, one may control the subsequent dispersion and fragmentation or disintegration of the compacted and cohesive material in the bottom zone of the fluidized mass, preferably in conjunction with certain controls of the space rates of the fluidizing gas. The space rate is herein defined as the velocity of the uprising gases with the assumption that the respective portion of the combustion chamber is not occupied by the material being fluidized. The space rate therefore is expressed as follows:

$$\text{Space rate in ft./sec.} = \frac{\text{total gas volume in cu. ft./sec.}}{\text{cross-sectional flow area in sq. ft.}}$$

While it is clear that fragmentation and distribution or dispersion must occur preceding the combustion proper, the subsequent effects upon the material occurring in the practice of the invention are more involved. That is to say, before combustion can take place, moisture must be evaporated and this in turn reduces the plug density, causing the waste material to migrate upwardly through the mass of inert fluidized material, losing moisture and disintegrating as it rises. It is, therefore, necessary that the depth of the bed be such that evaporation distillation of the volatile organic matter, and finally combustion of both the distillates and the fixed carbon take place within the fluidized mass, if the desired combustion temperature is to be substantially maintained by the heat content available in the waste material.

However, since the moisture is being evaporated from the solids, as they rise, the total effective volume of the fluidizing gas increases accordingly. In order that the desired space rate be maintained throughout the body of fluidized material, to keep the fragmented material in suspension in the medium of the fluidized material, the invention therefore provides that the cross-section of that portion of the combustion chamber, that contains the body of fluidized material, be upwardly gradually increased in a manner to maintain a substantially constant space rate throughout the depth of the fluidized mass.

In the operation of this invention, the aim is that the distillation gases should be thoroughly mixed with the required amount of oxygen and be burned within the body of the fluidized material itself, thus to aid effectively in maintaining a high enough combustion temperature in the fluidized mass. This becomes a problem inasmuch as the total time of passage of the gaseous phase from the bottom to the freeboard area is in the order of only 1.0 second, and through the upper 1.0 ft. of the depth is only 0.2 second. Therefore, if the distillation gases were driven off in the upper strata of the fluidized material, freeboard burning would occur, reducing the combustion temperature in the fluidized mass.

However, in the practice of the invention the distillation gases as well as the fixed carbon become mixed intimately with the required amount of combustion air and are destroyed by combustion before reaching the area of the freeboard space. This is best achieved by a combination of factors which comprises extruding the compacted wet waste material into the lower zone of the fluidized mass of inert granular material, at the aforementioned state of density and the aforementioned state of subdivision. Furthermore, the configuration of that portion of the combustion chamber occupied by the fluidized mass is such as to induce or establish space rates for the fluidizing gas whereby the initial chunks of extruded material are to be maintained in suspension so as to become fragmented and distributed in the lower zone, and in rising through an adequate depth of fluidized material eventually become reduced to superheated vapors and inert combustion gases before reaching the freeboard space from which they will escape to the stack carrying only residual ash and inert fines.

As an example, a dewatered sewage sludge having 30% total solids concentration is supplied from the dewatering operation, wherein 0.7 lb. of volatile solids contain 0.15 lb. of fixed carbon and 0.55 lb. of distillable matter, the balance of 0.3 lb. of the total solids being non-combustible inerts. With such waste material being extruded into the lower zone of the mass of inert fluidized material, the above indicated combustion results are attainable by self-sustained combustion in a bed of fluidized sand about 5 to 6 ft. deep and which may have a ratio of diameters of D–1/D–2 of about 0.76.

At about 1400° F. of average combustion temperature in the mass of fluidized sand, with an available heat content in the combustible organic matter of about 2250 B.t.u. per lb. of wet waste material, and with the volume of superheated water vapor and of combustion gas developing at those temperatures, the space rates for the mixed fluidizing gas at various elevations establish themselves approximately as follows:

(1) At elevation L–1, that is at the bottom of the fluidized mass, the space rate R–1 is about 3.6 ft./sec.

(2) At elevation L–2, a distance of one third from the bottom of the fluidized mass, the space rate R–2 is about 3.4 ft./sec.

(3) At elevation L–3, a distance of two thirds from the bottom of the fluidized mass, the space rate R–3 is about 3.1 ft./sec.

(4) At elevation L–4, that is at the top level of the fluidized mass, the space rate R–4 is about 2.8 ft./sec.

By providing a suitably graded inert granular material or sand, the combustion unit is operable within a range of space rates of the fluidizing gas, suited for the combustion operation of this invention. However, in order to establish uniform fluidization conditions, it is best to establish a space rate at the top equal to, or lower than the space rate at the bottom of the fluidized mass.

Furthermore, the bottom space rates should not be excessive, so as to avoid such undesirable phenomena as "jetting" of the sand into the freeboard space and/or channeling in the fluidized mass.

The ratio of diameters D–1/D–2 is selected so as to satisfy the above indicated space rate requirements. However, with any substantial change in the moisture content of the compacted extruded mass, the ratio of diameters may require a corresponding change.

With a moisture content ranging from about 50% to about 80%, a workable range of D–1/D–2 is from about 0.65 to about 0.85.

This will provide for space rates at the above indicated elevations in the following operable ranges;

(5) For L–1, the space rates R–5 are from about 2.6 to about 4.0 ft./sec.

(6) For L–2, the space rates R–6 are from about 2.4 to about 3.75 ft./sec.

(7) For L–3, the space rates R–7 are from about 2.2 to about 3.5 ft./sec.

(8) For L–4, the space rates R–8 are about 2.0 to about 3.25 ft./sec.

When the combustion operation was conducted and controlled in accordance with the foregoing example, it was observed that freeboard burning was substantially avoidable, provided that there was an interval of about one minute between the entry of the compacted material into the fluidized mass and the point of its complete combustion.

It was furthermore observed that freeboard burning would increase when the elapsed time was less than one minute coincidental with a reduction in the density of the compacted material or plug entering the combustion chamber. Accordingly, a control factor in conducting the combustion operation, lies in sufficiently compacting the wet waste material and/or subdividing the compacted mass or plug in the process of extrusion.

It will be understood that each of the elements described above, or two or more together, may also find useful applications in systems differing from the one described above.

While the invention has been illustrated and described as embodied in a system for the disposal of sewage sludge by combustion, it is not intended to be limited to the details shown, since various modifications and structural as well as operational changes may be made without departing from the spirit of this invention.

We claim:

1. The method of disposal of a high moisture organic waste cake material having a solids content of 20 to 50%, in a combustion chamber, which comprises providing in the lower portion of said combustion chamber a bed of substantial depth of inert granular material of heat storing and heat-radiating capability, maintaining said material at a temperature between 1200 and 1800° F.; continuously supplying into said bed of hot inert material a continuous upward stream of combustion air for maintaining said inert granular material in a fluidized state and supplying said high moisture waste material into said bed of hot fluidized material for combustion, including compressing said waste material and extruding a plug of the compressed wet waste cake material into the lower half of the bed of said fluidized material to be broken up and burned therein, confining said fluidized bed in said chamber to a tapered formation giving said fluidized bed a predetermined graduated horizontal cross-sectional area increasing from substantially the bottom of the bed to the top thereof by an amount approximately sufficient to compensate for the increased volume of gas resulting from volatilizing the water and organic material in said waste so as to maintain the space rate of the rising gases in the bed substantially no greater at the top of said bed than at the bottom, and in which the maximum of such space rate in the bed does not exceed the minimum space rate by more than 2 to 1, to maintain the pieces of said plug in the bed and thereby insure more complete burning therein.

2. The method according to claim 1 in which said bed cross-section increases uniformly from the bottom to the top of said bed.

3. The method of claim 1 in which said cross-sectional area at the bottom of said fluidized bed bears a ratio to the top of said portion of approximately 0.65 to 0.85.

4. The method according to claim 1 in which the space rate of the rising gases within fluidized bed is 2.6 to 4.0 feet per second at the bottom 2.4 to 3.75 ft./sec. at ⅓ of the height of the bed, 2.4 to 3.75 ft./sec. at ⅔ of the height of the bed and 2.0 to 3.25 ft./sec. at the top of the bed.

5. A combustion apparatus for effecting the combustion of high moisture organic waste cake material having a solids content between 20 and 50%, which comprises a combustion unit having a transverse constriction plate dividing the unit into a combustion chamber and a windbox chamber for supporting a bed of substantial depth of hot inert granular material having heat storing and heat radiating capability, said combustion unit including instrumentalities for maintaining said bed at between 1200 and 1800° F., means for supplying combustion air under pressure to said windbox chamber for maintaining said granular material in a fluidized state at above atmospheric pressure, means for compacting said organic waste cake into a solid plug and feeding it under pressure through the wall of the combustion chamber at a position substantially below the upper surface of said fluidized bed, said compacting and feeding means including a tubular delivery end portion axially movable through said wall, means providing a gas tight seal between said end portion and said wall while permitting said axial movement, said tubular delivery end portion operating to deliver said plug of compacted waste material directly into the bed of said fluidized material with said plug acting to seal said tubular end portion against loss of pressure from the combustion chamber, and means for mounting said end portion for movement toward and away from the wall to project or retract said end portion into or out of the bed to avoid subjecting said plug to combustion temperatures when feeding is interrupted.

6. A combustion apparatus for effecting the combustion of high moisture organic waste which comprises a combustion unit having a transverse constriction plate dividing the unit into a combustion chamber and a windbox chamber and adapted to support a bed of substantial depth of hot inert granular material having heat storing and heat radiating capability, said combustion unit including instrumentalities for maintaining said bed at between 1200 and 1800° F., means for supplying combustion air under pressure to said windbox chamber for maintaining said granular material in a fluidized state, means for extrusion feeding a compressed plug of said high moisture waste material through the wall of said combustion chamber directly into said fluidized bed at a position [in the lower half] *substantially below the upper surface* thereof, the portion of said combustion chamber surrounding said fluidized bed being of tapered form having a pre-determined graduated horizontal cross-sectional area increasing from substantially bottom to top by an amount sufficient to compensate for the increased volume of gas resulting from volatilizing the water and organic material in the waste so as to maintain the space rate of the rising gases in the bed at a generally uniform space rate of the rising gases through the fluidized material in which the maximum such space rate at any depth varies from the minimum by no more than 2 to 1, to retain plug portions in said bed for maximum burning in the bed and minimum burning in the freeboard.

7. The invention according to claim 6, in which the cross-sectional area of said chamber portion at the bottom of said bed surrounding portion bears a ratio to the top of said portion of approximately 0.65 to 0.85 and in which said cross-sectional area varies uniformly from bottom to top.

8. The invention according to claim 6, in which the space rate of the rising gases in the fluidized material is 2.6 to 4.0 feet per second at the bottom of said combustion chamber portion, 2.4 to 3.75 feet per second at one-third the height of the bed portion, 2.4 to 3.75 feet per second at two-thirds of the height of the bed and 2.0 to 3.25 at the top of the fluidized material.

9. The invention according to claim 6, in which said extrusion means includes knives in the path of the extruded material for subdividing the plug as it is extruded into said fluidized material.

10. The method of disposal of a high moisture organic waste cake material having a solids content of 20 to 50% by combustion in a combustion chamber, which comprises providing in the lower portion of said combustion chamber a bed of substantial depth of hot inert granular material having heat-storing and heat-radiating capability, maintaining said bed at a temperature between 1200 and 1800° F., continuously supplying into said bed of hot inert material from below a continuous upward stream of combustion air for maintaining said inert granular material in a fluidized state [and supplying] *feeding a compressed plug of* said cake material *directly* into said bed of hot fluidized material *under pressure through the wall of said combustion chamber* at a position [in the lower half] *substantially below the upper surface* of the bed *and* providing so much of the lower portion of said chamber, as contains said fluidized bed with a tapered formation to give said bed a predetermined graduated cross-sectional area increasing from bottom to top by an amount sufficient substantially to compensate for the increased volume of gas resulting from *volatilizing* [volitizing] the water and organic material in said waste so as to maintain the space rate of the rising gases in the bed substantially no greater at the top of said bed than at the bottom, and such that the maximum such space rate within the bed does not exceed the minimum by more than 2 to 1 *to* complete the drying and volatilizing and most of the burning of the organic material within said bed.

11. The method according to claim 10, in which said cross-sectional area of the fluidized bed varies substantially uniformly from the bottom to the top of said bed and the space rate of the rising gases within the fluidized bed in feet per second is 2.6 to 4.0 at the bottom, 2.4 to 3.75 at ⅓ the height of the bed, 2.2 to 3.5 at ⅔ the height of the bed and 2.00 to 3.25 at the top of the bed.

12. A combustion apparatus for effecting the combustion of high moisture organic waste cake material having a solids content between 20 and 50%, which comprises a combustion unit having a transverse constriction plate dividing the unit into a combustion chamber and a windbox chamber for supporting a bed of substantial depth of hot inert granular material having heat storing and heat radiating capability, said combustion unit including instrumentalities for maintaining said bed at between 1200 and 1800° F., means for supplying combustion air under pressure to said windbox chamber for maintaining said granular material in a fluidized state at above atmospheric pressure, means for compacting said organic waste cake into a solid plug and feeding it under pressure through the wall of the combustion chamber at a position substantially below the upper surface of said fluidized bed, said compacting and feeding means including a tubular delivery end portion extending through said wall, means providing a gas tight seal between said end portion and said wall, said tubular delivery end portion operating to deliver said plug of compacted waste material directly into the bed of said fluidized material with said plug acting to seal said tubular end portion against loss of pressure from the combustion chamber, said tubular delivery portion including knives extending inwardly from the tube into the path of the extruded material for subdividing the plug and better distributing the organic material in said bed.

References Cited

The following references, cited by the Examiner, are of record in the patented file of this patent or the original patent.

UNITED STATES PATENTS

| | | | |
|---|---|---|---|
| 2,088,879 | 8/1937 | Stouff | 110—28 |
| 2,650,084 | 8/1953 | White | 263—21 XR |
| 2,738,182 | 3/1956 | Thompson | 263—53 |
| 2,774,661 | 12/1956 | White | 263—21 XR |
| 2,932,713 | 4/1960 | Powers | 110—110 XR |
| 3,319,586 | 5/1967 | Albertson et al. | 110—8 |
| 2,171,535 | 9/1939 | Berg et al. | 110—8 |
| 2,386,991 | 10/1945 | Thomas | 110—101 X |

OTHER REFERENCES

Publication: Paper presented at 1963 meeting of the Water Pollution Control Federation in Seattle, Wash., Oct. 8, 1963; the front cover, and pp. 12 and 13.

FREDERICK L. MATTESON, Jr., Primary Examiner

H. B. RAMEY, Assistant Examiner